(No Model.)
J. PARENT.
WAGON GEAR.
No. 554,534. Patented Feb. 11, 1896.
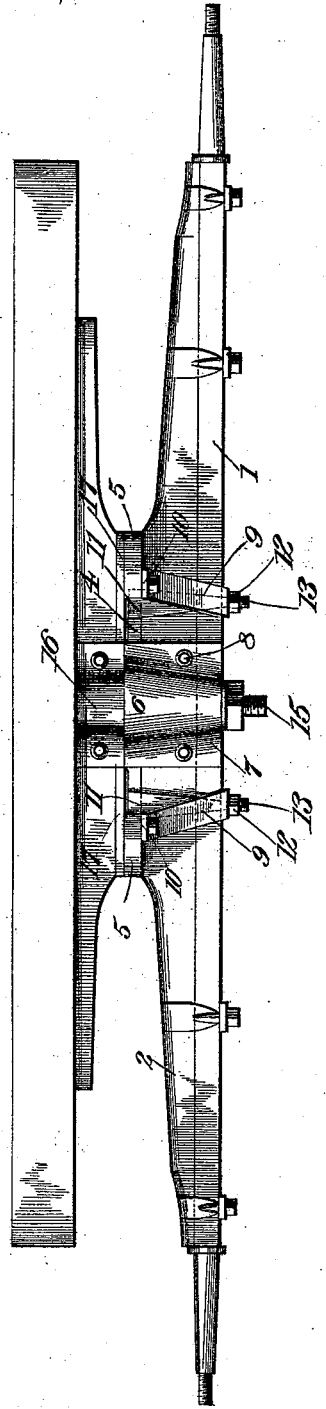
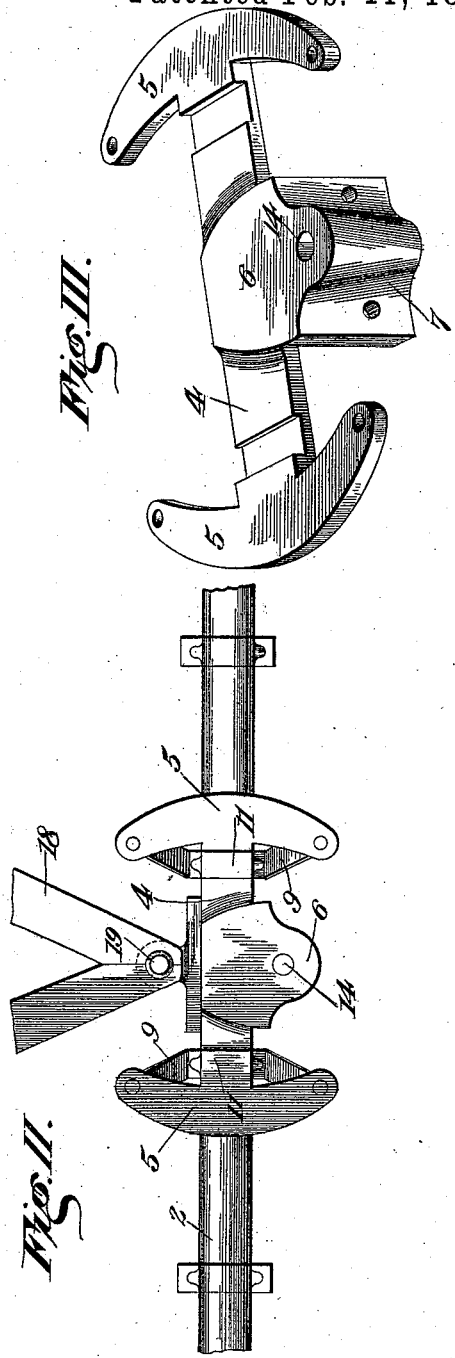
Witnesses
M. E. Fowler
Snacker
Inventor
John Parent
By Joseph L. Atkins,
Attorney.

UNITED STATES PATENT OFFICE.

JOHN PARENT, OF BRUNSWICK, MAINE.

WAGON-GEAR.

SPECIFICATION forming part of Letters Patent No. 554,534, dated February 11, 1896.

Application filed June 17, 1895. Serial No. 553,083. (No model.)

*To all whom it may concern:*

Be it known that I, JOHN PARENT, of Brunswick, county of Cumberland, State of Maine, have invented certain new and useful Improvements in Wagons, of which the following is a specification, reference being had to the accompanying drawings.

My invention relates to improvements in the turning-gears of wagons of that class known as "truck-wagons," in which the load rests directly upon bolsters without the use of intermediate springs.

The object of my invention is to improve the turning-gear of wagons of the above description so as to avoid unnecessary wear and to facilitate the operation of making a turn.

In the accompanying drawings, Figure I is a front elevation of the front axle and bolster of a wagon embodying my invention. Fig. II is a top plan view thereof with the bolster removed. Fig. III is a perspective view of the supporting swivel-frame detached.

Referring to the figures on the drawings, 1 indicates the front axle of a truck-wagon of any suitable and ordinary construction. 2 indicates the bed-piece thereof.

My invention partially consists in providing a self-contained supporting-piece upon the bed-piece, which pivotally carries the bolster. Of this part, 4 indicates the body part that consists of an oblong strip of metal that corresponds in width to the bed-piece of the axle and lies flat upon it. On its opposite ends it is provided with supporting-wings 5. At its middle part it is provided with a head 6 having a base 7 that lies flat against the face of the bed-piece and may be secured to it, as by bolts 8.

9 indicates supporting-pieces that span the under part of the axle and are bolted at its opposite ends, as indicated at 10, to the wings. 11 indicates straps that are fixed around the axle, the bed-piece, and the body part 4 of the swivel supporting-frame, and, passing through the supporting-pieces 9, secure the parts together by nuts 12 screwing on terminal bolt ends 13 of the straps. The head 6 is provided with an eccentric coupling-bore 14, into which a pin 15, secured to a piece 16 on the front of the bolster, is inserted. The supporting-wings, when the parts are united, pivotally and eccentrically support the bolster. The bolster may be provided, to prevent wear, with bearing-plates 17 on its under side.

The coupling-tongue or perch 18 of the wagon is pivotally secured, as indicated at 19, on the rear side of the front axle. By this arrangement a double pivotal connection is provided, one for supporting the body or load of the wagon on one side of the axle, and the other for securing the rear part of the wagon to the front axle on the rear thereof.

What I claim is—

1. In a vehicle, the combination with front and rear axles and an intermediate pivotal connection, of a bolster, and a pivotal connection for the same in front of the front axle, substantially as set forth.

2. In a vehicle, the combination with front and rear axles and an intermediate pivotal connection, of a bolster, and an intermediate pivotal connection for the same upon the front axle in front thereof, substantially as set forth.

3. The combination with the front axle of a vehicle, of a swivel supporting-piece consisting of a body part secured to the axle, wings thereon, supporting-pieces spanning the under part of the axle and secured at their opposite ends to the wings, and straps passing around the axle, its bed-piece and the body part of the swivel supporting-frame and secured at their extremities to the supporting-pieces, substantially as specified.

In testimony of all which I have hereunto subscribed my name.

JOHN PARENT.

Witnesses:
 JAMES L. DOOLITTLE,
 CLARENCE E. SAWYER.